United States Patent [19]

Hannah

[11] Patent Number: 4,789,927

[45] Date of Patent: Dec. 6, 1988

[54] INTERLEAVED PIPELINE PARALLEL PROCESSING ARCHITECTURE

[75] Inventor: Marc Hannah, Menlo Park, Calif.

[73] Assignee: Silicon Graphics, Inc., Mountain View, Calif.

[21] Appl. No.: 849,004

[22] Filed: Apr. 7, 1986

[51] Int. Cl.$^4$ ............................................. G06F 9/38
[52] U.S. Cl. .................................................. 364/200
[58] Field of Search ............... 364/200, 900; 370/60, 370/94; 340/825.52

[56] References Cited

U.S. PATENT DOCUMENTS 4,543,630  4/1985  Neches .............................. 364/200
4,598,400  7/1986  Hillis ................................. 370/60
4,663,706  5/1987  Allen et al. ........................ 364/200

Primary Examiner—Gary V. Harkcom
Assistant Examiner—David L. Clark
Attorney, Agent, or Firm—Blakely, Sokoloff, Taylor & Zafman

[57] ABSTRACT

A system for processing of data wherein the data is inputted over time into the system such that a second packet of data is inputted before a first packet of data, the system comprising a first processor coupled to a second processor, the first processor operating on only the first packet of data and the second processor operating on only the second packet of data.

1 Claim, 3 Drawing Sheets $b_1 = f_1(a_1)$ ; $b_2 = f_2(a_2)$ $c_1 = g_1(b_1)$ ; $c_2 = g_2(b_2)$

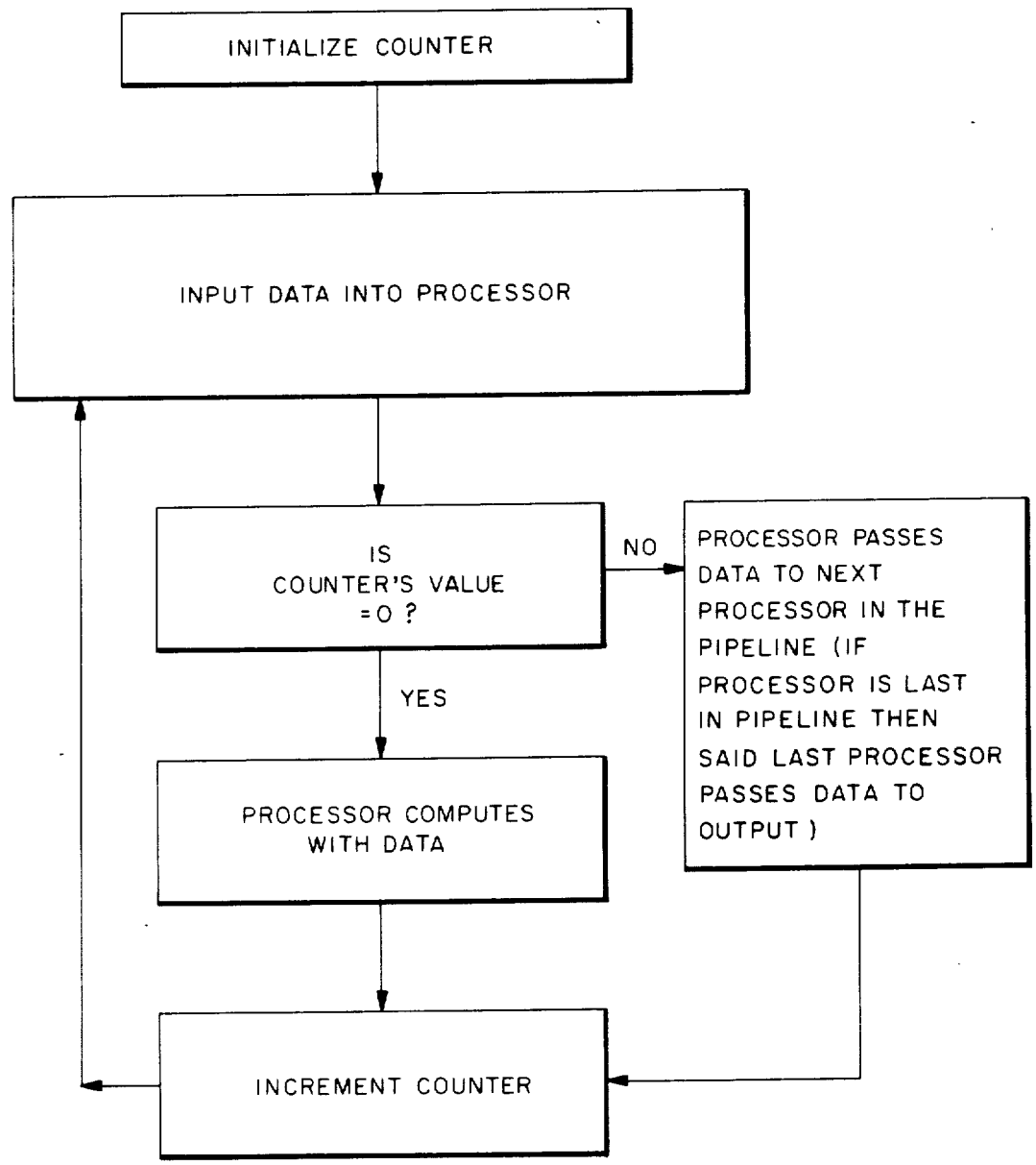
FIG_7

INTERLEAVED PIPELINE PARALLEL PROCESSING ARCHITECTURE

BACKGROUND OF APPLICATION

1. Field of Invention

This invention relates to the field of data processing in general and specifically to the field of parallel processing architectures.

2. Prior Art

Various architectures are known in the prior art for processing of data, usually in a digital computer. The classic architecture is that of a single processor which receives inputs, including the data to be processed, and delivers outputs yielding the result dictated by the operation, usually programmed, of the processor. For example, in a microcomputer a microprocessor typically receives data, usually consisting of digital inputs, and processes that data according to a predefined computer program to yield the result of the operation of the microprocessor which is usually outputted for some use. Such a microcomputer usually consists of input and output devices along with storage, arithmetic, logic units and a control unit. Frequently, the microprocessor includes a portion of all of these components.

Recently, structures have been considered which contemporaneously handle, in separate processors, the data in order to speed up the processing of the data. In such structures, the data lines are handled by separate processors of the computer. The architecture of such a computer utilizing more than one processor is referred to as a parallel processing architecture. In the prior art, such architectures utilized several processors which are coupled such that they each receive only the data designed to be processed by the particular processor. Thus, there is usually a means for switching data between two processors such that the first processor receives only the data intended to be manipulated in that processor and the second processor receives only the data intended to be manipulated by the second processor. Thus, in the prior art architectures, there are usually two or more routes (pipes) through which data flows, the data being directed down the appropriate pipe by hardware external to the processors.

SUMMARY OF INVENTION

The invention involves a parallel processing architecture wherein the data flows through each processor. Each of the processors, in the invention, is usually configured to include a means, such as a counter, for determining whether the processor should act on a particular packet of data or, rather, should merely pass that data unaltered to the next processor in the series of processors.

In a typical implementation of the invention, there is a first processor which is coupled to a second processor. The data to be processed is inputted over time into the system such that, over a given time, N packets of data are inputted; in particular, the Nth packet of data is inputted first, the N−1 packet is inputted second, the nth packet is inputted N−(n−1), and the first packet is inputted last. Typically, the data is a stream of data having a repeating pattern of N packets of data. It should be understood that the data values are not necessarily repeated; it is merely the pattern of N packets which repeats. Where two processors, a first and a second, are used, there are normally 2 packets of data in each pattern. The first processor receives the second packet of data before it receives the first packet of data. The first processor then passes the second packet of data, unaltered, to the second processor and, contemporaneously, the first processor receives the first packet of data. The first processor passes the second packet of data when it determines that a counter, or other means, coupled to the first processor indicates that that particular packet (i.e. the second packet of data) is not to be operated on by the first processor. After the first processor passes the second packet of data to the second processor, the counter associated with the first processor has been incremented to the next number in its count. Having done so, that counter, or other means, is set to indicate to the first processor that the first processor should act (i.e. compute) on the first packet of data. Typically, a modulo-N counter is utilized so that the next group of N packets of data may be processed as described herein. Similarly, a counter coupled to the second processor, when queried by that processor, will cause that processor to act on only the second packet of data.

The counters are initialized to a different value for each of the processors coupled to the counters. After inputting the data into the processor and after each processor checks the current value of its associated counter, the current value in the counter is changed to the next value in its sequence.

If the counters and processors are programmable, the invention permits greater flexibility in restructuring the system than in the prior art parallel architectures.

DESCRIPTION OF DRAWINGS

The following figures are used to illustrate the principles of this invention:

FIG. 7 shows a flow chart illustrating how each processor-counter pair, such as in FIG. 3, operates on the data in the pipeline.

DETAIL DESCRIPTION OF THE INVENTION

Parallel Processing Architectures having improved flexibility are disclosed for processing data. In the following description for purposes of explanation specific numbers, signals, registers, etc. are set forth in order to provide a thorough understanding of the present invention. However, it would be apparent to one skilled in the art that the invention may be practiced without these specific details. In other instances, well known circuits and devices are shown in block diagram form in order not to obscure the present invention unnecessarily.

Figure 1:
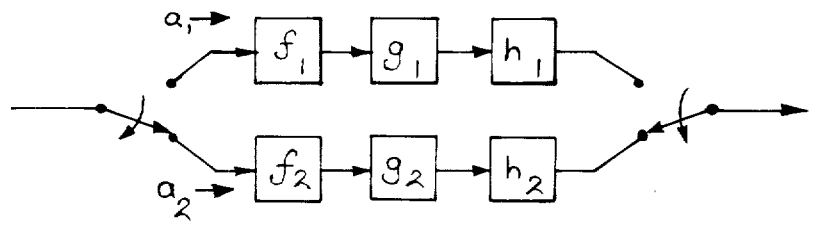
FIG. 1 shows a prior art parallel processing architecture.

FIG. 1 shows a block diagram of a parallel processing architecture used in the prior art. Each of the blocks labeled $f_1$, $g_1$, $h_1$, $f_2$, $g_2$, $h_2$, is a processor capable of executing a predefined computation ("operation"). An example of an operation would be the division of an input by 3. For example, each of these processors may be microprocessors. In this particular architecture, the first set of processors, namely, $f_1$, $g_1$, $h_1$, all receive only a portion of the data; that is, they receive that portion of the inputs which is intended to be computed using the first set of processors. Similarly, the second set of processors, namely $f_2$, $g_2$, and $h_2$ receive only a portion of the data which portion is that intended to be used in the various computations in the second set of processors. Typically, each processor will perform a predefined, programmable function. For example, the $f_1$ processor may divide the input $a_1$ by the value 3. The result of that division would then be outputted to the input of the processor $g_1$ which would take that result and multiply it by 4. The processor $g_1$ would then output this result of that multiplication to the processor $h_1$ which may add 2 to that result by the value 2. These computation examples merely illustrate the possibilities available with the various processors. The second set of processors in FIG. 1 performs the same operations on a different set of data, the input of which may be called $a_2$. Thus, $a_2$ is operated on by $f_2$ such that $a_2$ is divided by 3. Then, $f_2$ outputs the result of that division to $g_2$ which multiplies the result by 4, which then outputs the result of the multiplication to $h_2$ which adds the value 2 to the result. It can be seen that in this architecture the data is divided between two sets of processors which each include a subset of processors, such as $f_1$ and $f_2$, which perform the same operation (division by 3) on the inputted data.

This prior art architecture usually requires external hardware for demultiplexing and multiplexing of the command stream which is usually necessary to control the operation of the various processors in both sets of processors. The invention avoids the need for that hardware. The invention is particularly advantageous where the processing can be separated into independent operations on indepenent pieces of data. The invention increases throughput of data without requiring a reduction in the amount of time it takes for the data in independent operations to be computed. Moreover, the invention permits easier reconfiguration of the system.

Figure 3:
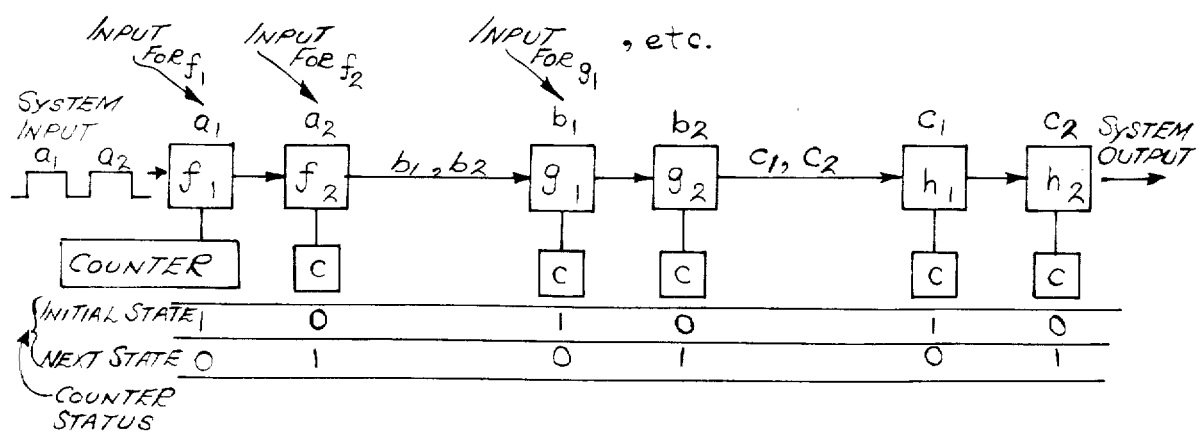
FIG. 3 shows another parallel architecture of the invention with the processors interleaved so that they are grouped according to the processing operation they perform on the data.

Referring now to FIG. 3, a parallel processing architecture of the invention is shown. In this system, the data is inputted over time into the system such that the second packet of data is inputted before the first packet of data. It is noted that, if there are N packets of data, then there will be N processors of the f type, and N Processors of the g type, and N processors of the h type, etc. In this example, however, in order not to obscure the invention, two packets of data over a given time will be used as an input sequence. It is noted that the invention may utilize more than one input sequence each having N packets of information because the data is usually a stream of data having a repeating pattern of N packets of data. Again, the data itself does not necessarily repeat; indeed, the data will usually vary. It is the pattern of N packets which repeats. Thus, for the example in FIG. 3, there would be a stream of data having a repeating pattern of 2 packets of data. Also see FIG. 4.

It is advantageous that the N data packets in a given sequence be inputted into the system of the invention in rapid succession and in the stated order (i.e. Nth packet first and first packet last) so that each processor operating on one of the data packets receives its input at about the same time. It is also advantageous that the amount of time it takes for data to be passed through the processors be small with respect to the computation time.

Referring now to FIG. 3, a first plurality of processors is shown, those processors being $f_1$ and $f_2$. The first processor, $f_1$, of the first plurality of processors is coupled to a second processor, $f_2$, of the first plurality of processors. The second processor of the first plurality of processors may be followed by a first-in first-out ("FIFO") buffer (not shown), which receives the outputs of both $f_1$ and $f_2$ and stores those outputs until $g_1$ and $g_2$, the processors comprising the second set of processors, are ready to accept the input of the next packet of data.

Each of the processors shown in FIG. 3 is coupled to a counter, which is typically a modulo-N counter which, in the recurring sequence of two packets of data over time, counts and stores up to a value of $N-1$ and then reverts to zero. Modulo-N counters are well known to those skilled in the art. For $N=2$ (i.e. a modulo-2 counter), the counter initialized at zero counts 0, 1, 0, 1, 0, 1, . . . etc. The modulo-N counter continues in its recurring sequence. Each counter is initialized to a different value such that the processor coupled to a particular counter compares the current value of the counter to zero and finds the value is zero only when that processor is intended to operate on the data just inputted into the processor. The processor will perform its computational operation if the current value is zero. FIG. 3 shows the initial status of the counters; hence, the initial status of the counter coupled to $f_1$ is 1. Thus, for example, $f_1$ will compute the data only when the data packet is the first data packet.

Alternately, the processor could carry out its computation operation on the data packet when that data packet number is equal to any single value in the counting sequence.

Referring again to FIG. 3, when the system begins its operation, the counter coupled to the first processor of the first plurality of processors is initialized to the value 1. From the initialized state, when the second packet of data is inputted into the first processor, $f_1$, of the first plurality of processors, the first processor, $f_1$, of the first plurality of processors compares the current number in the counter to zero. If that value is not equal to zero, the processor passes the data packet on to the next processor; the processor does not alter the data and does not do any computational operations based on the data. If the value in the counter is equal to zero, the processor, performs its computational operation on the packet of data. The interaction of each processor and its coupled counter is illustrated in FIG. 7. Hence, in the beginning of the operation of the system shown in FIG. 3, the first processor, $f_1$, of the first plurality of processors will pass, without any operations, the second packet of data onto the second processor, $f_2$, of the first plurality of processors. After each processor looks at the current value in its counter, the counter is changed so that it goes to the next value in its sequence. Hence, after $f_1$ looks at its counter's initial value, which is 1, that counter reverts to zero. The counter is not altered upon the output of data from the processor. Of course, as an alternative, one could merely reverse when the counter is incremented so that it is incremented only on output. It will be appreciated that the counter values may increase or decrease by any value; any single value, rather than zero, may be used as the reference value for indicating when each processor should compute. "Increment" is usually used herein to indicate a change in the counter's value.

When the first packet of data is inputted to the first processor, $f_1$, of the first plurality of processors, the current value in the counter will be equal to zero and the first processor, $f_1$, of the first plurality of processors will compute its predefined function using $a_1$, the data in the first packet of information, as its input. Similarly, when the second packet of data is inputted into the second processor of the first plurality of processors, the second processor, $f_2$, of the first plurality of processors compares the current value of the counter coupled to $f_2$ to zero. Again, if that comparison shows that the current value of the counter is equal to zero, the processor $f_2$ will carry out its computational exercise on the data in that packet. It can be seen that when $f_1$ outputs the result ($b_1$) of $f_1$'s operation on the first packet of data, the counter value for $f_2$ will be 1 (that counter having been reverted to zero following the input of $a_2$ into $f_2$). Thus, $f_2$ will merely pass the result, $b_1$, of $f_1$'s operation, and $f_2$'s counter will be reverted to zero, making $f_2$ ready to accept and compute on the next $a_2$ in the stream of data.

Hence, the first processor, $f_1$, of the first plurality of processors operates on only the first packet of data and the second processor, $f_2$, of the first plurality of processors operates only on the second packet of data. Similarly, the first processor, $g_1$, of the second plurality of processors operates only on the result of the operation of the first processor, $f_1$, of the first plurality of processors (that result is $b_1$); the operation of the processor $g_1$ yields the first result $c_1$ of the second plurality of processors from the input $b_1$. Similarly, the processor $g_2$ operates only on the result of the operation of the second processor, $f_2$, of the first plurality of processors. The result of the operation of the second processor, $g_2$, of the second plurality of processors yields a second result, $c_2$, of the second plurality of the processors. The processors $h_1$ and $h_2$, shown in FIG. 3 act in the same manner as the $f_1$ and $f_2$ processors and the $g_1$ and $g_2$ processors of FIG. 3. Again, the results of the first plurality of processors, $b_1$ and $b_2$, may be inputted into and stored in a FIFO buffer to wait until the next plurality of processors is available.

There is typically also a handshaking buffer incorporated into each processor so that the order of the packets of data is preserved. For example, the result of $f_1$ is not delivered to $f_2$ until $f_2$ has finished its operation on the second packet of data. This will assure that the order of the packets of data are not rearranged. It is noted that the second processor in each plurality of processors passes the output, unaffected, of the first processor through to the next stage, which may be preceded by a FIFO buffer.

The first processor, $f_1$, of the first plurality of processors performs the same operation on the first packet of data that the second processor, $f_2$, of the first plurality of processors performs on the second packet of data. Thus, if $f_1$ is dividing the input by 3, $f_2$ will divide its input, $a_2$, by 3.

The FIFO buffer is a data buffer which may be coupled between the first plurality of processors and the second plurality of processors. Indeed, it may be placed in front of any processor, depending on the needs of the application. Such a buffer may be coupled between the second plurality of processors and the third plurality of processors, and so on. Thus, the FIFO data buffer may be coupled between the first processor, $g_1$, of the second plurality of processors and the second processor, $f_2$, of the first plurality of processors in FIG. 3. The data buffer receives and stores the results of the operations on the first and second packets of data and outputs those results by outputting the result of the operation on the first packet of data after outputting the result of the operation on the second packet of data. Thus, the first processor, "$g_1$", of the second plurality of processors receives the result of the computation carried out by $f_2$ before it receives the result of the computation carried out by $f_1$. Again, upon receiving the input, $b_2$, which input is the result of the computation carried out by the processor $f_2$, the processor $g_1$ compares the current value of its counter to zero. If, as in the initialized case, the value of the counter is not equal to zero, $g_1$ will pass the data to the next processor, $g_2$, and will then increment its counter to the next value, in this case zero. Upon receiving the output of the processor $f_1$, the processor $g_1$ will compare the current value of the counter to zero and it can be seen when $b_1$ is inputted into $g_1$, the value of the counter is equal to zero, and so $g_1$ will perform its computational operation on the input $b_1$ to yield the first result, $c_1$, of the second plurality of processors.

Figure 2:
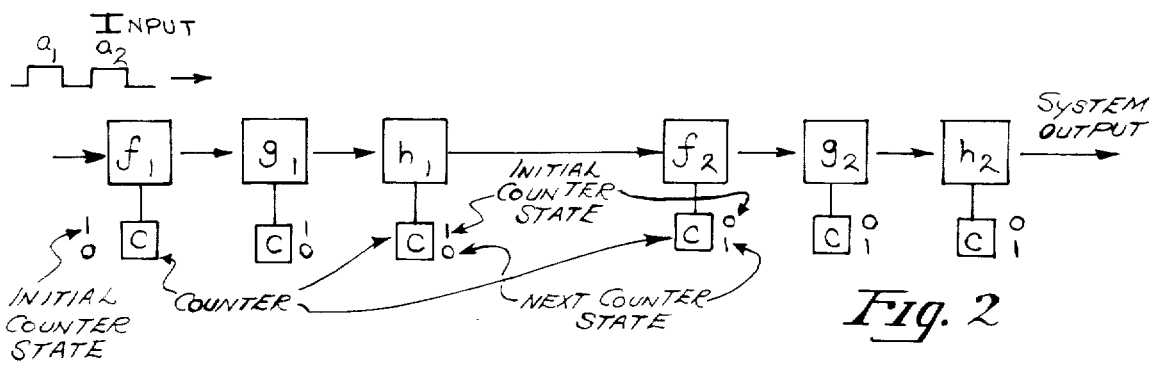
FIG. 2 shows a parallel architecture of the invention.

FIG. 2 shows another implementation of the invention in which the processors described above are coupled in series except that processors performing the same operation are not grouped together. In the system shown in FIG. 2, data is inputted over time into the system such that over a given period of time N packets of data are inputted wherein the Nth packet of data is inputted first, the $N-1$ packet is inputted second and the nth packet is inputted $N-(n-1)$, and the first packet is inputted last. Again, the data is usually a stream of data having a repeating pattern of N packets of data. The invention shown in FIG. 2 includes a first set of processors, $f_1$ $g_1$, and $h_1$, which are coupled together in series. In this particular example, the first set of processors is coupled to the second set of processors. The second set of processors comprises $f_2$, $g_2$ and $h_2$. In general the number of sets of processors should be equal to the number N (i.e. N packets of data). Moreover, there should be N states in each counter. A FIFO buffer may be used to separate the first set of processors from the second set of processors.

As with the above architecture shown in FIG. 3, each of the processors shown in FIG. 2 of the first set of processors performs a particular function and each processor of the second set of processors performs a particular function such that the nth processor of the second set of processors performs the same operation that the nth processor of the first set of processors performs. For example, $g_1$ of the first set of processors performs the same operation, e.g. multiplication by 4, as $g_2$, the second processor of the second set of processors. However, the invention shown in FIG. 2 does not require that this be the case; consequently, $f_2$ could perform an entirely different operation (e.g. sin (x)) than $f_1$ (e.g. +3). Each processor of the first set of processors operates on only one of the N packets such that the first set of processors operates on only the first packet of data.

Referring to FIG. 2, each of the processors in the first set of processors is coupled to a counter from a first set of counters which has N counters. Each of the counters of the first set of counters is associated with and coupled to one of the processors of the first set of processors such that the nth counter of the first set of counters is coupled to the nth processor of the first set of processors. Similarly, each processor of the second set of processors is coupled to and associated with a counter from the second set of counters. As with the first set of counters the nth counter of the second set of counters is coupled to the nth processor of the second set of processors. These counters, in both the first and second set of counters, are typically modulo-N counters as described above. FIG. 2 shows how th counters would be initialized for N=2 (i.e. 2 packets of data in the repeating pattern). The counters are used by the processors to determine whether the processor should act on the data or merely pass it to the next processor in the series.

Referring again to FIG. 2, it can be seen that the system begins operation on $a_2$'s input into $f_1$; $f_1$ will check its counter, which is initially at one, and $f_1$ will cause $a_2$ to be passed to $g_1$. The $f_1$ processor is the first processor of the first set of processors. The $f_1$ counter will be "incremented" to zero. The output of $a_2$ from $f_1$ does not affect the $f_1$ counter. Next, $a_1$ enters $f_1$, $f_1$ determines that its counter is zero, the counter increments to 1, and $f_1$ performs its computational operation on $a_1$ since $f_1$'s counter was at zero on $a_1$'s input to $f_1$. The change to 1 in $f_1$'s counter makes $f_1$ ready to pass the next packet of data (which will be a second packet of data from the next pattern of data). When $a_2$ is passed to $g_1$, the $g_1$ counter is examined; since that counter is 1, $g_1$, will pass $a_2$ to $h_1$, and $g_1$'s counter is incremented to zero (making $g_1$ ready to perform $g_1$'s operation on the result of $f_1$'s operation). Similarly, when $a_2$ is passed to $h_1$, the $h_1$ counter is examined; since that counter is 1, $h_1$, will pass $a_2$ to $f_2$, where $a_2$ will be operated on (since the $f_2$ counter is at zero). Similar events continue down the remainder of the processing system shown in FIG. 2. Again, a handshaking means should be included on each processor to prevent a reordering of the packets of data. Thus, $h_1$ of FIG. 2 should not output the result of the first set of processors ($f_1$, $g_1$, and $h_1$) to $f_2$ until $f_2$ has completed its operation on $a_2$ and is ready to output the result of $f_2$ on $a_2$. Similarly, $f_2$ should not pass the result of the first set of processors to $g_2$ until $g_2$ has completed its operation on the result of $f_2$'s operation on $a_2$.

The incrementation of the counter may occur by the processor instructing the counter, immediately after examining the counter's contents, to "increment" to the next value in the counter's sequence. Various other alternatives are possible; for example, the counter may be "incremented" after the computational operation. The counter may be part of the processor (not shown) or may be a separate part (shown in FIGS. 2 and 3). In order to increase the flexibility of the system, the counter should be capable of being changed to fit new applications. For example, the counter should be capable of reconfiguration from a modulo-2 counter to a modulo-3 counter, etc. Various other means, such as the described counter means, may be used for assuring that a first processor, such as $f_1$ of FIG. 2, operates on only the first packet of data and a second processor, such as $f_2$ of FIG. 2, operates on only the second packet of data. For instance, if the computation times are known reasonably well and are consistent, one may use timers (or a timer) from which each processor can determine whether the data it has received should be passed or operated on.

Figure 6:
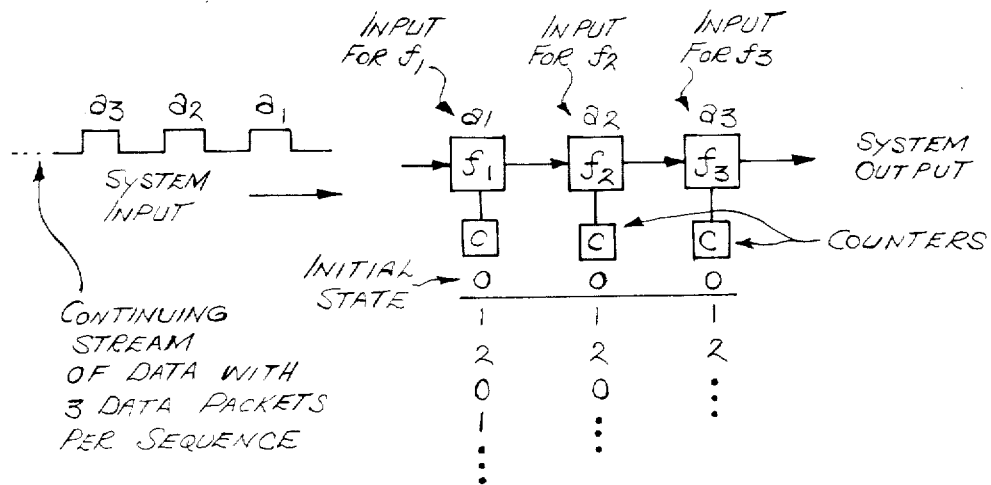
FIG. 6 shows a parallel architecture of the invention.

It is noted that the order of the packets may be reversed, (i.e., the first packet inputted first, the second packet inputted second, etc.) if the counters coupled to processors operating on different packets in a sequence (i.e. the different packets in a repeating pattern (e.g. $f_1$ and $f_2$)) are given the same initial value, and if the processors contain a means, e.g. an interrupt mechanism or a demultiplexor, whereby data may be inputted and passed while the processor is computing, and the processor contains a means whereby the proper data packet sequence is maintained. For example if the processor does not output the result of its operation until the next packet of data that will be inputted to that processor is one that is to be operated upon by that processor, e.g. by waiting until the counter value is zero for that processor before outputting the result. This permits the first processor (or processors) operating on the first packet of data to accept data from another packet while the first processor is computing (i.e. operating on the first packet of data). It also permits the first processor, while operating on the first packet of data, to pass the second packet of data to the second processor, which is coupled to the first processor. Referring to FIG. 6, it can be seen that such a system, employing 3 processors for 3 packets of data in a given sequence, can operate if the sequences of data packets are maintained (i.e. the same) at the processing system input, which is coupled to the first processor, and at the processing system output.

Figure 4:
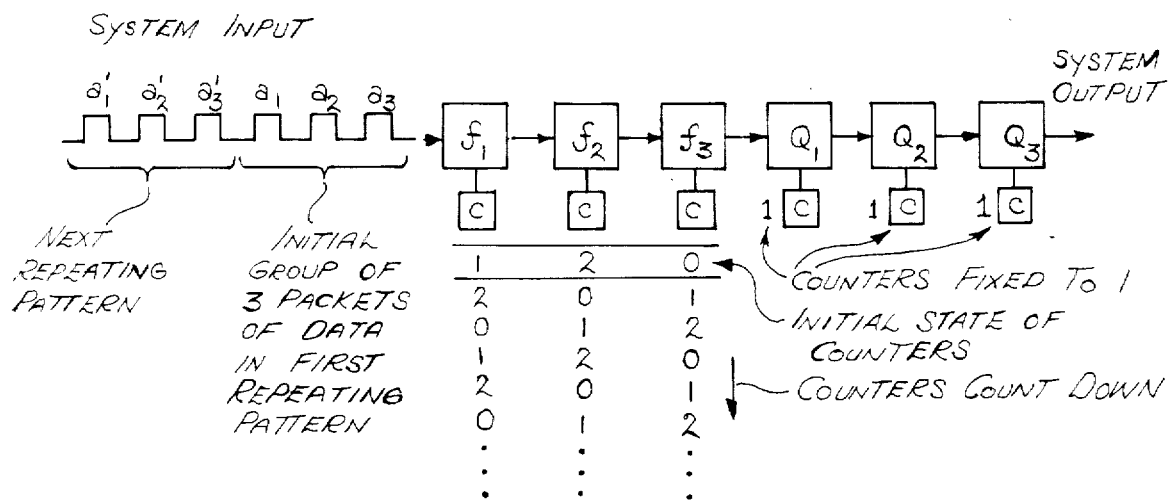
FIG. 4 shows a parallel architecture of the invention.

The flexibility of the invention will be shown by comparing FIG. 4 and FIG. 2. FIG. 4 was derived from FIG. 2 by changing the first 3 counters of FIG. 2 to modulo-3 counters and by reprogramming the processors as indicated on FIG. 4 (i.e. $g_1$, to $f_2$; $h_1$, to $f_3$) and by requiring the last 3 processors of FIG. 2 (labelled as $Q_1$, $Q_2$ and $Q_3$ in FIG. 4) to simply pass the data (e.g. by setting their counters fixed to 1). The $f_1$ processor of FIG. 4 is a first processor of the first set of processors, there being only one processor in that set; thus, $f_1$ in FIG. 4 functions by passing $a_2$ and $a_3$ and operating on only $a_1$. Similarly, $f_2$ is a second processor of the second set of processors, there being only one processor in that set. The $f_2$ processor of FIG. 4 will pass $a_3$ and will pass $f_1$'s result on $a_1$ and operate on only $a_2$. The $f_3$ processor of FIG. 4 will pass $f_1$'s result on $a_1$ and will pass operate on only $a_3$.

The reconfiguration process may be accomplished by changing counters, storage registers in the processors, the programs controlling the processors, etc.

Figure 5:
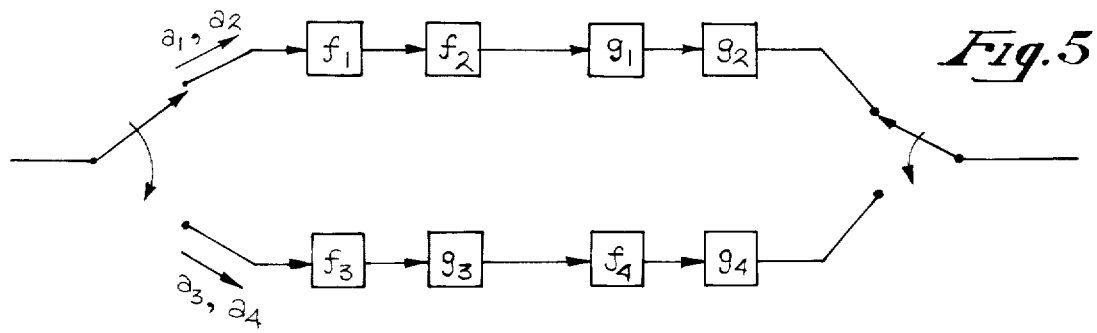
FIG. 5 shows a hybrid parallel architecture of the invention.

It is noted that the invention may be used with the prior art configuration shown in FIG. 1 to create hybrid architectures. For example, a pipeline system such as in FIG. 3 may be combined with another pipeline having the architecture of FIG. 3. One pipeline would receive only $a_1$ and $a_2$ and the other would receive only $a_3$ and $a_4$. The interleaved configuration of FIG. 3 could be combined with the configuration of FIG. 2. FIG. 5 illustrates a hybrid architecture using the prior art architecture with the interleaved configuration of FIG. 3 and the configuration of FIG. 2.

Although the invention has been illustrated using FIGS. 2 through 5 and using the accompanying description, it will be appreciated by one skilled in the art that the present invention is limited only by the claims made herein.

I claim:

1. A system for processing of data, said data being inputted in a serial pipeline in a predetermined order into said system such that a second packet of data is inputted into said system before a first packet of data, said system comprising:
  a system input in said serial pipeline:
  a system output in said serial pipeline;
  a first processor in said serial pipeline coupled to said system input for receiving said first and said second packets of data, said first processor receiving said second packet of data and passing said second packet of data to a second processor in said serial pipeline coupled to said first processor, said first processor receiving said first packet of data and performing a computational operation on said first packet of data, said first processor outputting the result of its operation on said first packet of data to said second processor, said first processor having a first means for assuring that said first processor operates on only said first packet of data and a means for assuring that said second packet of data is passed to said second processor before the result of the operation on said first packet of data is outputted to said second processor;

said second processor coupled to said system output, said second processor receiving said second packet of data and performing a computational operation on said second packet of data, said second processor outputting to said system output the result of its operation on said second packet of data, said second processor receiving the result of the operation of said first processor on said first packet of data, said second processor passing the result of the operation of said first processor on said first packet of data to said system output, said second processor having a second means for assuring that said second processor operates on only said second packet of data and means for assuring that the result on said second packet of data is outputted in time from said system before the result on said first packet of data is outputted from said system, wherein said data is a stream of data having a repeating pattern of at least a first packet of data and a second packet of data and wherein said first means for assuring is a first modulo-N counter and said second means for assuring is a second modulo-N counter, where N is equal to the number of packets of data in said repeating pattern wherein said first processor only processes data when said first modulo-N counter is at a first specific predetermined value and said second processor only processes data when said second modulo-N counter is at a second specific predetermined value, whereby both said first and second packets of data in the serial pipeline proceed through said first and said second processors and said first processor operates on only said first packet of data and said second processor operates on only said second packet of data.

* * * * *